(12) United States Patent
Wang et al.

(10) Patent No.: US 10,996,517 B2
(45) Date of Patent: May 4, 2021

(54) BACKLIGHT AND LIQUID CRYSTAL DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Fei Wang, Beijing (CN); Xiandong Meng, Beijing (CN); Meili Wang, Beijing (CN); Huijuan Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 393 days.

(21) Appl. No.: 16/081,804

(22) PCT Filed: Feb. 11, 2018

(86) PCT No.: PCT/CN2018/076320
§ 371 (c)(1),
(2) Date: Aug. 31, 2018

(87) PCT Pub. No.: WO2018/171362
PCT Pub. Date: Sep. 27, 2018

(65) Prior Publication Data
US 2021/0041745 A1    Feb. 11, 2021

(30) Foreign Application Priority Data
Mar. 20, 2017    (CN) .......................... 201720273714.9

(51) Int. Cl.
*G02F 1/13357*    (2006.01)
*G02F 1/1335*    (2006.01)

(52) U.S. Cl.
CPC .. *G02F 1/133621* (2013.01); *G02F 1/133602* (2013.01); *G02F 1/133607* (2021.01); *G02F 1/133613* (2021.01); *G02F 2201/30* (2013.01)

(58) Field of Classification Search
CPC ..................................... G02F 1/1336
See application file for complete search history.

(56) References Cited

U.S. PATENT DOCUMENTS

2005/0083696 A1\* 4/2005 Chiang ................ H04N 9/3114
362/268
2007/0047221 A1\* 3/2007 Park .................. G02F 1/133603
362/97.3

(Continued)

FOREIGN PATENT DOCUMENTS

CN    2769942 Y    4/2006
CN    1920642 A    2/2007

(Continued)

OTHER PUBLICATIONS

International Search Report and Written Opinion issued in International Application No. PCT/CN2018/076320, dated May 9, 2018; with English translation.

*Primary Examiner* — Sang V Nguyen
(74) *Attorney, Agent, or Firm* — McDermott Will and Emery LLP

(57) ABSTRACT

A backlight includes a plurality of light sources of at least three different colors disposed on a base substrate, and a plurality of grating units that are disposed on a light exit side of the plurality of light sources and are in one-to-one correspondence with the plurality of light sources. Each of the plurality of grating units is used for splitting light emitted by a corresponding one of the plurality of light sources to form in an array of uniformly distributed monochromatic spots, so that the backlight may form an array of colored spots in which at least three different colors of light spots are (Continued)

alternately arranged in sequence along a first direction, wherein the first direction is a row direction or a column direction of the array of colored spots.

14 Claims, 4 Drawing Sheets

(56) References Cited

U.S. PATENT DOCUMENTS

| | | | | |
|---|---|---|---|---|
| 2013/0278787 A1* | 10/2013 | Shpunt | ............... | H04N 5/37452 |
| | | | | 348/218.1 |
| 2016/0197452 A1* | 7/2016 | Mor | .................... | H01S 5/02253 |
| | | | | 359/569 |
| 2017/0322015 A1* | 11/2017 | Knuttel | ................ | G03H 1/0443 |

FOREIGN PATENT DOCUMENTS

| | | | | |
|---|---|---|---|---|
| CN | 101149445 | * | 3/2008 | ........... G02F 1/1335 |
| CN | 101149445 A | | 3/2008 | |
| CN | 205334016 U | | 6/2016 | |
| CN | 206541105 U | | 10/2017 | |
| CN | 206684430 U | | 11/2017 | |
| JP | 2011-154078 A | | 8/2011 | |

\* cited by examiner

BACKLIGHT AND LIQUID CRYSTAL DISPLAY DEVICE

CROSS-REFERENCE TO RELATED APPLICATION

This application is a national phase entry under 35 USC 371 of International Patent Application No. PCT/CN2018/076320 filed on 11 Feb. 2018, which claims priority to Chinese Patent Application No. 201720273714.9, filed on Mar. 20, 2017, titled "A BACKLIGHT AND A LIQUID CRYSTAL DISPLAY DEVICE", which is incorporated herein by reference in its entirety.

TECHNICAL FIELD

The present disclosure relates to the field of display technologies, and in particular, to a backlight and a liquid crystal display device.

BACKGROUND

A Liquid crystal display (LCD), as a flat panel display device, is increasingly used in the field of high performance display due to its small size, low power consumption, no radiation, and relatively low manufacturing cost.

As shown in FIG. 1, an existing LCD includes a backlight 01 and a display panel 02. Generally, light emitted by the backlight 01 is white light. Therefore, in order to achieve color display, it is necessary to provide a color film layer 021 in the display panel 01. The color film layer 021 includes a first color pattern layer 0211, a second color pattern layer 0212, and a third color pattern layer 0213. When the white light emitted by the backlight 01 is incident on the color film layer 021 through a liquid crystal layer, light having a color different from the color pattern layer in the light passing through each color pattern layer is absorbed, and light having the same color as the color pattern layer can be transmitted, thereby achieving color display.

However, since when the white light passes through each color pattern layer, only the light having the same color as the color pattern layer can be transmitted, and the light having a color different from the color pattern layer is absorbed, the light utilization efficiency of the display device is relatively low, and the power consumption is high.

SUMMARY

Embodiments of the present disclosure adopt the following technical solutions:

An aspect of the embodiments of the present disclosure provides a backlight, comprising a plurality of light sources of at least three different colors disposed on a base substrate, and a plurality of grating units that are disposed on a light exit side of the plurality of light sources and are in one-to-one correspondence with the plurality of light sources. Each of the plurality of grating units is used for splitting light emitted by a corresponding one of the plurality of light sources to form an array of uniformly distributed monochromatic spot, so that an array of colored spots, in which at least three different colors of light spots are alternately arranged in sequence along a first direction, is formable by the backlight, wherein the first direction is a row direction or a column direction of the array of colored spots.

Optionally, the plurality of grating units are Dammann gratings.

Optionally, the backlight further comprises a plurality of lenses that are located between the plurality of light sources and the plurality of grating units and are in one-to-one correspondence with the plurality of light sources, and each of the plurality of lenses is used for converging light emitted by a corresponding one of the plurality of light sources.

Optionally, the plurality of light sources are collimated light sources.

Optionally, the plurality of lenses and the plurality of light sources are an integrated structure; or, the plurality of lenses and the plurality of light sources are an assembled structure.

Optionally, the plurality of lenses are aspherical lenses, Fresnel lenses or gradient-index lenses.

Optionally, in a case where the plurality of lenses and the plurality of light sources are the assembled structure, at least a part of the plurality of lenses is an integrated structure.

Optionally, the plurality of light sources of at least three different colors comprise a plurality of first color light sources, a plurality of second color light sources and a plurality of third color light sources, and the plurality of first color light sources, the plurality of second color light sources and the plurality of third color light sources are alternately arranged in sequence along the first direction.

Optionally, the plurality of grating units are an integrated structure.

Another aspect of the embodiments of the present disclosure further provides an LCD device, comprising any one of the backlights described above, wherein the array of spots formed by the backlight corresponds to an array of sub-pixels of the display device.

BRIEF DESCRIPTION OF THE DRAWINGS

In order to describe technical solutions in embodiments of the present disclosure or the prior art more clearly, the drawings to be used in the description of embodiments or the prior art will be introduced briefly. Obviously, the drawings to be described below are merely some embodiments of the present disclosure, and a person of ordinary skill in the art can obtain other drawings according to those drawings without paying any creative effort.

DETAILED DESCRIPTION

The technical solutions in the embodiments of the present disclosure will be described clearly and completely below with reference to the accompanying drawings in embodiments of the present disclosure. Apparently, the described embodiments are only a part but not all of the embodiments of the present disclosure. All other embodiments obtained by a person of ordinary skill in the art based on the embodiments of the present disclosure without paying any creative effort shall be included in the protection scope of the present disclosure.

Some embodiments of the present disclosure provide a backlight and an LCD device, which may avoid the problem of low light utilization efficiency resulted by the use of a color film layer for filtering when a color display is achieved.

Some embodiments of the present disclosure provide a backlight and an LCD device, each of which includes a plurality of light sources of at least three different colors disposed on a base substrate, and a plurality of grating units that are disposed on a light exit side of the plurality of light sources and are in one-to-one correspondence with the plurality of light sources. Each of the plurality of grating units is used for splitting light emitted by a corresponding one of the plurality of light sources to form an array of uniformly distributed monochromatic spots, so that the backlight may form an array of colored spots in which at least three different colors of light spots are alternately arranged in sequence along a first direction, wherein the first direction is a row direction or a column direction of the array of colored spots. In this way, when the backlight is used in a LCD device, the array of spots formed by the backlight corresponds to an array of sub-pixels of the display device. That is, the three different colors of light spots that are alternately arranged in sequence along the first direction correspond to three colors of sub-pixels that are alternately arranged in sequence along the first direction in the display device. Consequently, it may be avoided to use a color film layer for filtering to achieve color display, and the light utilization efficiency of the backlight may be improved.

Figure 1:
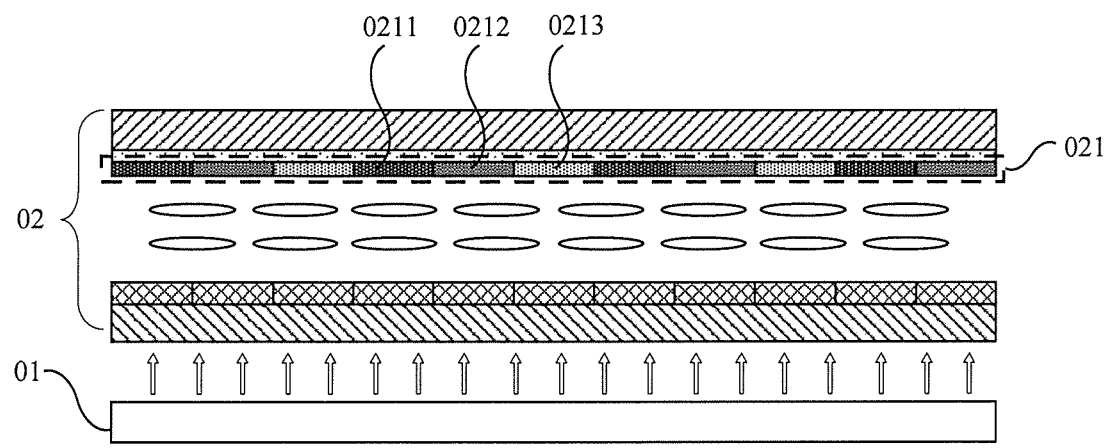
FIG. 1 is a schematic structural diagram of an LCD device provided in the related art.
Figure 2:
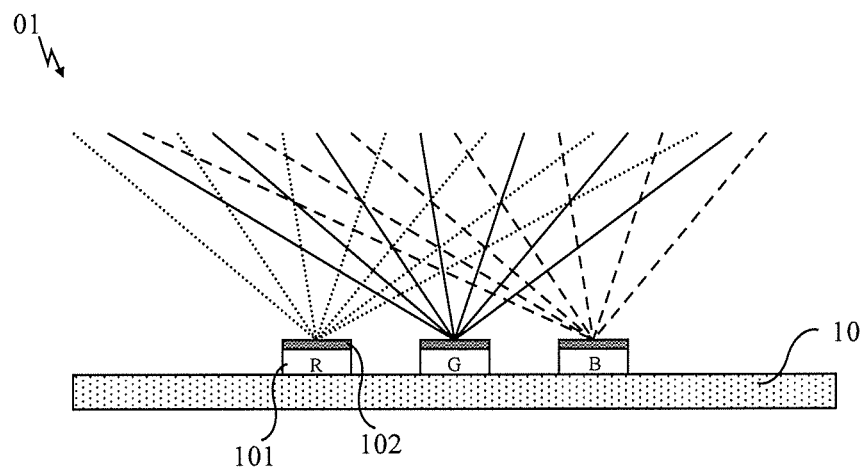
FIG. 2 is a schematic structural diagram of a backlight provided by some embodiments of the present disclosure.
Figure 3:
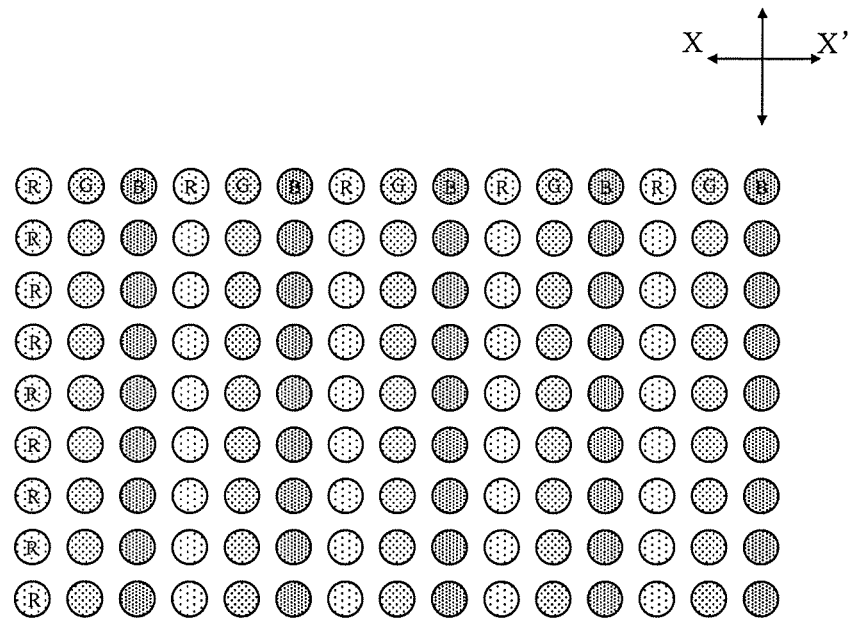
FIG. 3 is a schematic diagram of an array of spots formed by the backlight in FIG. 2.

Some embodiments of the present disclosure provide a backlight. As shown in FIG. 2, the backlight 01 includes a plurality of light sources 101 of at least three different colors disposed on a base substrate 10, and a plurality of grating units 102 that are disposed on a light exit side of the plurality of light sources 101 and are in one-to-one correspondence with the plurality of light sources 101. Each of the plurality of grating units is used for splitting light emitted by a corresponding one of the plurality of light sources 101 to form an array of uniformly distributed monochromatic spots, as shown in FIG. 3, so that the backlight 01 may form an array of colored spots in which at least three different colors of light spots are alternately arranged in sequence along a first direction X-X', wherein the first direction X-X' is a row direction or a column direction of the array of colored spots.

It will be noted that first, the plurality of light sources 101 of at least three different colors may include a first color light source, such as a red light source (R), a second color light source, such as a green light source (G), and a third color light source, such as a blue light source (B). Of course, it may also include other colors of light sources, such as a yellow light source, a blue-green light source, etc. Specifically, the light sources of different colors may be red, green and blue light emitting diodes (LEDs), which is not specifically limited herein, as along as the backlight can achieve color display when used in a display device.

Second, the array of monochromatic spots may be a one-dimensional array of spots or a two-dimensional array of spots. When array of the monochromatic spots is a one-dimensional array of spots, the backlight includes a plurality of light sources of this color to meet the display requirement. In order to avoid the use of too many light sources, optionally, the array of monochromatic spots is a two-dimensional array of spots. In addition, the array of colored spots may be a one-dimensional array of spots or a two-dimensional array of spots. When the array of colored spots is a one-dimensional array of spots, a plurality of backlights is needed when using the array of colored spots in a display device. Optionally, the array of colored spots is generally a two-dimensional array of spots, so that only one backlight is needed to meet the display requirement.

Third, the array of colored spots in which at least three different colors of light spots are alternately arranged in sequence along the first direction X-X' refers to an array of colored spots in which the light spots of all rows are composed of three different colors of light spots that are alternately arranged in sequence, or an array of colored spots in which the light spots of all columns are composed of three different colors of light spots that are alternately arranged in sequence, which is not specifically limited herein. In practical use, the choice can be made according to actual needs. For example, as shown in FIG. 3, the first direction X-X' is generally selected as the row direction of the array of colored spots. That is, in the array of colored spots, each row of light spots is composed of three different colors of light spots that are alternately arranged in sequence, and optionally, the light spots in a direction perpendicular to the first direction X-X' (i.e., the column direction) are of the same color.

In this way, when the backlight is used in an LCD device, the array of spots formed by the backlight corresponds to an array of sub-pixels (the schematic diagram of which is shown in FIG. 3 in which the arrangement of sub-pixels R, G, and B are shown) of the display device. That is, the light spots of three colors that are alternately arranged in sequence along the first direction correspond to the sub-pixels of three colors that are alternately arranged in sequence along the first direction in the display device. Consequently, it may be avoided to use a color film layer for filtering to achieve color display, and the light utilization efficiency of the backlight may be improved.

Figure 4:
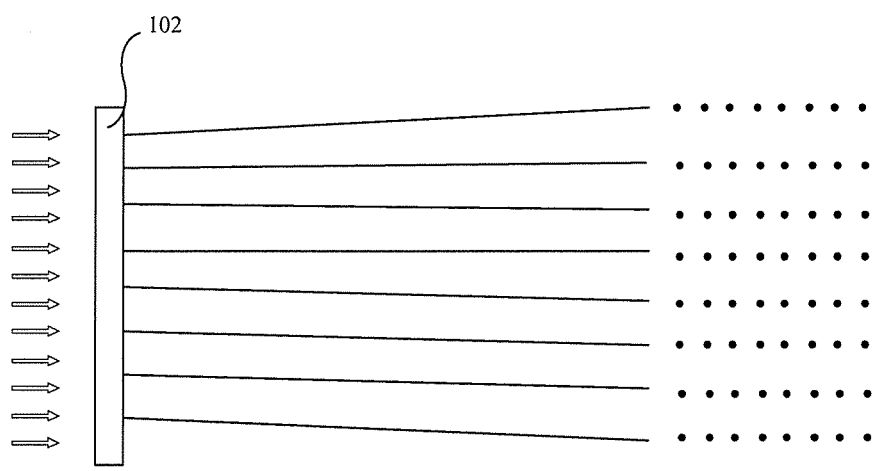
FIG. 4 is a schematic diagram of forming an array of spots through a Dammann grating provided by some embodiments of the present disclosure.

On this basis, in order to better split the light, optionally, the plurality of grating units 102 are Dammann gratings. FIG. 4 shows an array of uniformly distributed spots that may be formed after the light passes through a Dammann grating 102. Of course, due to the specific structure of the Dammann grating 102, generally, the light spots formed at the center of the array of spots are brighter, which may have a certain impact on the brightness uniformity of an image in actual display. Therefore, in practical use, an ideal plane wave incidence may be adopted, and the grating may be optimized to ensure that the light can form an array of equidistant spots with equal light intensity after passing through the Dammann grating 102. Of course, the present disclosure is not limited thereto, and other gratings can be selected in practice to achieve light splitting. In all of the following embodiments, the Dammann grating 102 is used as an example to further illustrate the present disclosure.

Further, in order to facilitate installation and reduce installation errors, optionally, all of the plurality of grating units 102 are an integrated structure in the present disclosure. That is, the plurality of grating units 102 corresponding to all of the plurality of light sources 101 are an integrated grating layer, which is assembled as a whole according to a preset relative position of the plurality of grating units and the plurality of light sources.

Figure 5:
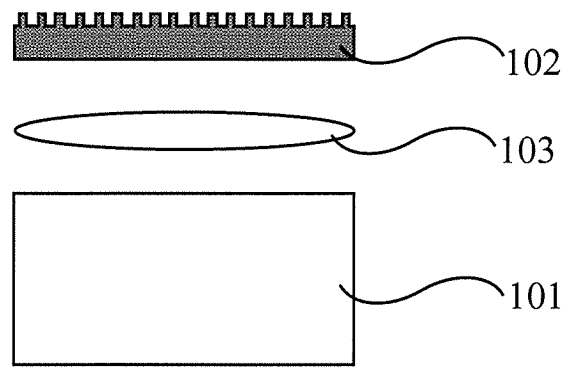
FIG. 5 is a schematic diagram of a structural unit for forming an array of spots with single color provided by some embodiments of the present disclosure.

In addition, in order to prevent the light incident on the grating from being relatively dispersed and ensure that the incident light is relatively converged, so that the light spots in the array of spots are uniformly distributed, as shown in FIG. 5 (FIG. 5 is merely an example of a structural unit forming an array of spots with single color), the backlight 01 further includes a plurality of lenses 103 that are located between the plurality of light sources 101 and the plurality of grating units 102 and are in one-to-one correspondence with the plurality of light sources 101. Each of the plurality of lenses 103 is used for converging light emitted by a corresponding one of the plurality of light sources 101 so that the converged light is incident on a corresponding one of the plurality of grating units 102 to ensure that the light spots in the array of spots are uniformly distributed. Of course, instead of using the plurality of lenses 103, adopting a plurality of light sources 101 that are collimated light sources can also ensure that the light spots in the array of spots are uniformly distributed. The present disclosure is not limited thereto, and the choice can be made according to actual needs in practical use.

On this basis, for the backlight 01, as shown in FIG. 5, in the case that the plurality of lenses 103 are located between the plurality of light sources 101 and the plurality of grating units 102 and are in one-to-one correspondence with the plurality of light sources 101, each of the plurality of lenses 103 and a corresponding one of plurality of light sources 101 may be an integrated structure. That is, in the process of fabricating each of the plurality of light sources 101, a corresponding one of the plurality of lenses 103 is simultaneously fabricated. Of course, the plurality of lenses 103 and the plurality of light sources 101 can also be an assembled structure, that is, each of the plurality of light sources 101 and a corresponding one of plurality of lenses 103 may be fabricated separately and then be assembled together.

Further, in the case where the plurality of lenses 103 and the plurality of light sources 101 are an assembled structure, optionally, at least a part of the plurality of lenses 103 is an integrated structure. That is, a part of the plurality of lenses 103 in the backlight may be an integrated lens layer, or all of the plurality of lenses 103 may be an integrated lens layer. At the time of assembly, the plurality of lenses 103 can be directly assembled according to a relative position among the plurality of lenses 103, the plurality of light sources 101 and the plurality of grating units 102, so as to avoid large errors caused by assembling single lenses for multiple times and simplify the installation process.

In addition, the plurality of lenses 103 may be aspherical lenses, Fresnel lenses or gradient-index lenses, which is not specifically limited herein. The choice can be made according to actual needs, as long as the light can be converged.

Yet further, in order to meet the requirement of display devices of various sizes, for example, large-sized display devices, correspondingly, the backlight needs to adopt a large-sized structure. In this case, the backlight 01 may include a plurality of first color light sources, a plurality of second color light sources and a plurality of third color light sources, so that the array of spots formed by the plurality of light sources meets the requirement of large-sized display devices.

On this basis, in order to ensure that the plurality of light sources form an array of uniformly distributed spots and simplify installation of the light sources, optionally, the plurality of first color light sources, the plurality of second color light sources and the plurality of third color light sources are alternately arranged in sequence along the first direction X-X'.

Figure 6A:
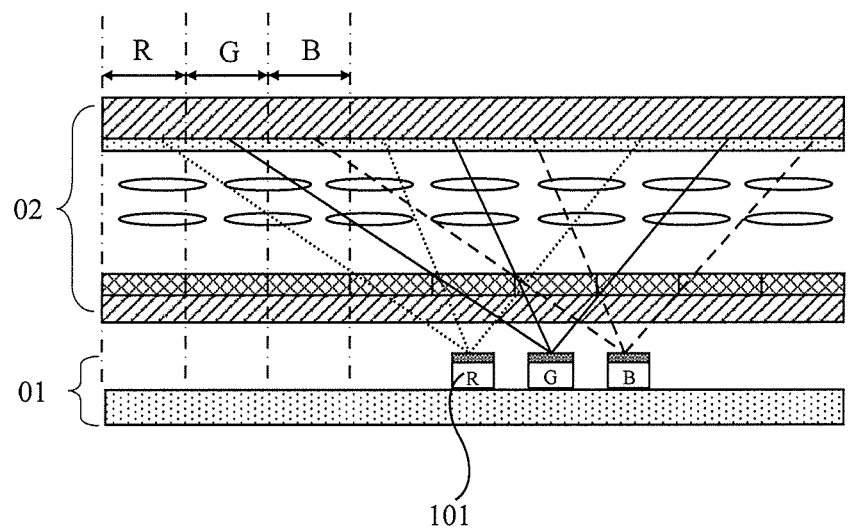
FIG. 6a is a schematic structural diagram of an LCD device provided by some embodiments of the present disclosure.
Figure 6B:
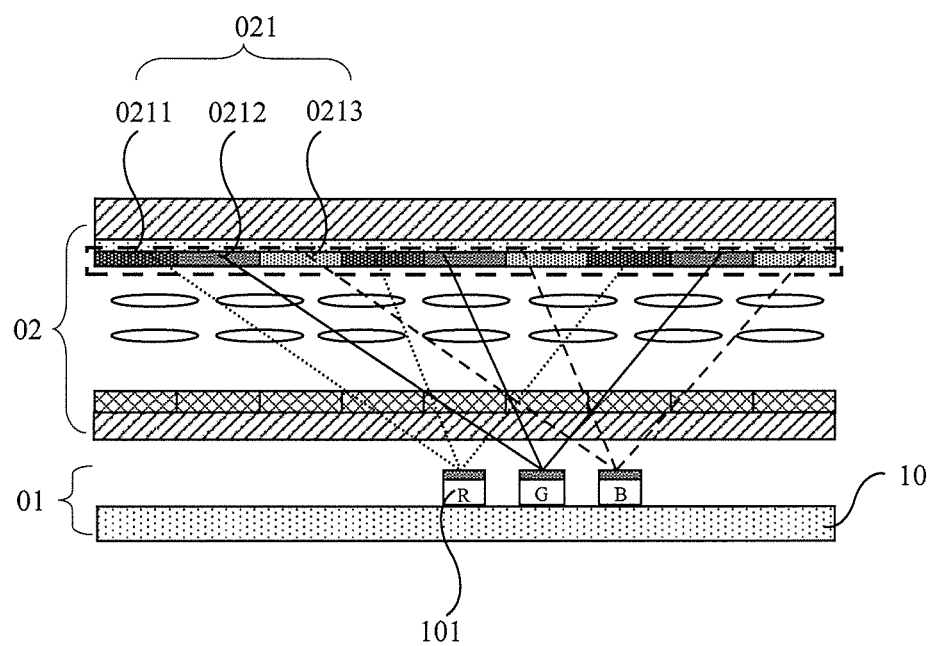
FIG. 6b is a schematic structural diagram of another LCD device provided by some embodiments of the present disclosure.

Some embodiments of the present disclosure further provide an LCD device. As shown in FIGS. 6a and 6b, the LCD device includes a display panel 02 and any one of the backlights 01 described above. The array of spots formed by the backlight 01 corresponds to an array of sub-pixels of the LCD device. The LCD device includes the same structure as the backlights provided by the foregoing embodiments, and has the same beneficial effects as the backlights. Since the structure and beneficial effects of the backlights have been elaborated in the foregoing embodiments, they will not be repeated here.

It will be noted that as shown in FIG. 6a, a color film layer 021 may not be provided in the display panel 02, because color display can be achieved when light spots of a corresponding color correspond to sub-pixels of the corresponding color. For example, in FIG. 6a, red spots formed by red light sources correspond to red sub-pixels (R) in the display panel. Of course, in this case, not only that color display may be achieved without using a color film layer and the light utilization efficiency may be improved, but also the overall thickness of the device may be reduced, which is in line with the lightweight, thin design concept of display devices.

Of course, as shown in FIG. 6b, in order to ensure the color saturation and screen contrast of the display device, the color film layer 021 may also be provided. In this case, the light spots of the first color are incident on a first color pattern layer 0211 of the color film layer 021. For example, as shown in FIG. 6b, the red spots formed by the red light sources are incident on a red pattern layer of the color film layer 021. The light spots of the second color are incident on a second color pattern layer 0212 of the color film layer 021, and the light spots of the third color are incident on a third color pattern layer 0213 of the color film layer 021.

The foregoing descriptions are merely some specific implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be subject to the protection scope of the claims.

The present disclosure may also provide additional embodiments, which may include any of the above embodiments, and one or more of the components, functions or structures in the additional embodiments may be replaced or supplemented by one or more of the components, functions or structures in any of the various embodiments described above.

What is claimed is:
1. A backlight, comprising:
    a plurality of light sources including a first color light source, a second color light source and a third color light source which are arranged on a base substrate in sequence along a first direction; and a first color, a second color and a third color are different from one another; and
    a plurality of grating units including a first grating unit, a second grating unit and a third grating unit, wherein
    the first grating unit is disposed on a light exit side of the first color light source, and the first grating unit is configured to split light emitted by the first color light source to form an array of uniformly distributed first color spots;
    the second grating unit is disposed on a light exit side of the second color light source, and the second grating unit is configured to split light emitted by the second color light source to form an array of uniformly distributed second color spots;

the third grating unit is disposed on a light exit side of the third color light source, and the third grating unit is configured to split light emitted by the third color light source to form an array of uniformly distributed third color spots;

one light spot in the array of uniformly distributed first color spots, one light spot in the array of uniformly distributed second color spots and one light spot in the array of uniformly distributed third color spots are arranged in sequence along the first direction to form one group of colored spots; another light spot in the array of uniformly distributed first color spots, another light spot in the array of uniformly distributed second color spots and another light spot in the array of uniformly distributed third color spots are arranged in sequence along the first direction to form another group of colored spots; a plurality of groups of colored spots are arranged in sequence along the first direction to form an array of colored spots;

wherein the first direction is a row direction or a column direction of the array of colored spots.

2. The backlight according to claim 1, wherein the plurality of grating units are Dammann gratings.

3. The backlight according to claim 1, wherein the backlight further comprises a lens that is disposed between the first color light source and the first grating unit, a lens that is disposed between the second color light source and the second grating unit, and a lens that is disposed between the third color light source and the third grating unit; and each lens is configured to converge light emitted by a corresponding one of the plurality of light sources.

4. The backlight according to claim 1, wherein the first light source, the second light source and the third light source are collimated light sources.

5. The backlight according to claim 3, wherein the first light source and its corresponding lens are an integrated structure; or, first light source and its corresponding lens are an assembled structure;

the second light source and its corresponding lens are an integrated structure; or, the second light source and its corresponding lens are an assembled structure;

the third light source and its corresponding lens are an integrated structure; or, the third light source and its corresponding lens are an assembled structure.

6. The backlight according to claim 3, wherein the lens is an aspherical lens, a Fresnel lens or a gradient-index lens.

7. The backlight according to claim 1, wherein the plurality of grating units are an integrated structure.

8. A liquid crystal display device, comprising a backlight, wherein the backlight comprises:

a plurality of light sources including a first color light source, a second color light source and a third color light source which are arranged on a base substrate in sequence along a first direction; and a first color, a second color and a third color are different from one another; and a plurality of grating units including a first grating unit, a second grating unit and a third grating unit, wherein the first grating unit is disposed on a light exit side of the first color light source, and the first grating unit is configured to split light emitted by the first color light source to form an array of uniformly distributed first color spots;

the second grating unit is disposed on a light exit side of the second color light source, and the second grating unit is configured to split light emitted by the second color light source to form an array of uniformly distributed second color spots;

the third grating unit is disposed on a light exit side of the third color light source, and the third grating unit is configured to split light emitted by the third color light source to form an array of uniformly distributed third color spots;

one light spot in the array of uniformly distributed first color spots, one light spot in the array of uniformly distributed second color spots and one light spot in the array of uniformly distributed third color spots are arranged in sequence along the first direction to form one group of colored spots; another light spot in the array of uniformly distributed first color spots, another light spot in the array of uniformly distributed second color spots and another light spot in the array of uniformly distributed third color spots are arranged in sequence along the first direction to form another group of colored spots; a plurality of groups of colored spots are arranged in sequence along the first direction to form an array of colored spots;

wherein the first direction is a row direction or a column direction of the array of colored spots, and the array of colored spots formed by the backlight corresponds to an array of sub-pixels of the display device.

9. The liquid crystal display device according to claim 8, wherein the plurality of grating units are Dammann gratings.

10. The liquid crystal display device according to claim 8, wherein the backlight further comprises a lens that is disposed between the first light source and the first grating unit, a lens that is disposed between the second color light source and the second grating unit, and a lens that is disposed between the third color light source and the third grating unit; and each lens is configured to converge light emitted by a corresponding one of the plurality of light sources.

11. The liquid crystal display device according to claim 8, wherein the first light source, the second light source and the third light source are collimated light sources.

12. The liquid crystal display device according to claim 10, wherein the first light source and its corresponding lens are an integrated structure; or, the first light source and its corresponding lens are an assembled structure;

the second light source and its corresponding lens are an integrated structure; or, the second light source and its corresponding lens are an assembled structure;

the third light source and its corresponding lens are an integrated structure; or, the third light source and its corresponding lens are an assembled structure.

13. The liquid crystal display device according to claim 10, wherein the lens is a aspherical lens, a Fresnel lens or a gradient-index lenses.

14. The liquid crystal display device according to claim 8, wherein the plurality of grating units are an integrated structure.

* * * * *